Figure 1:
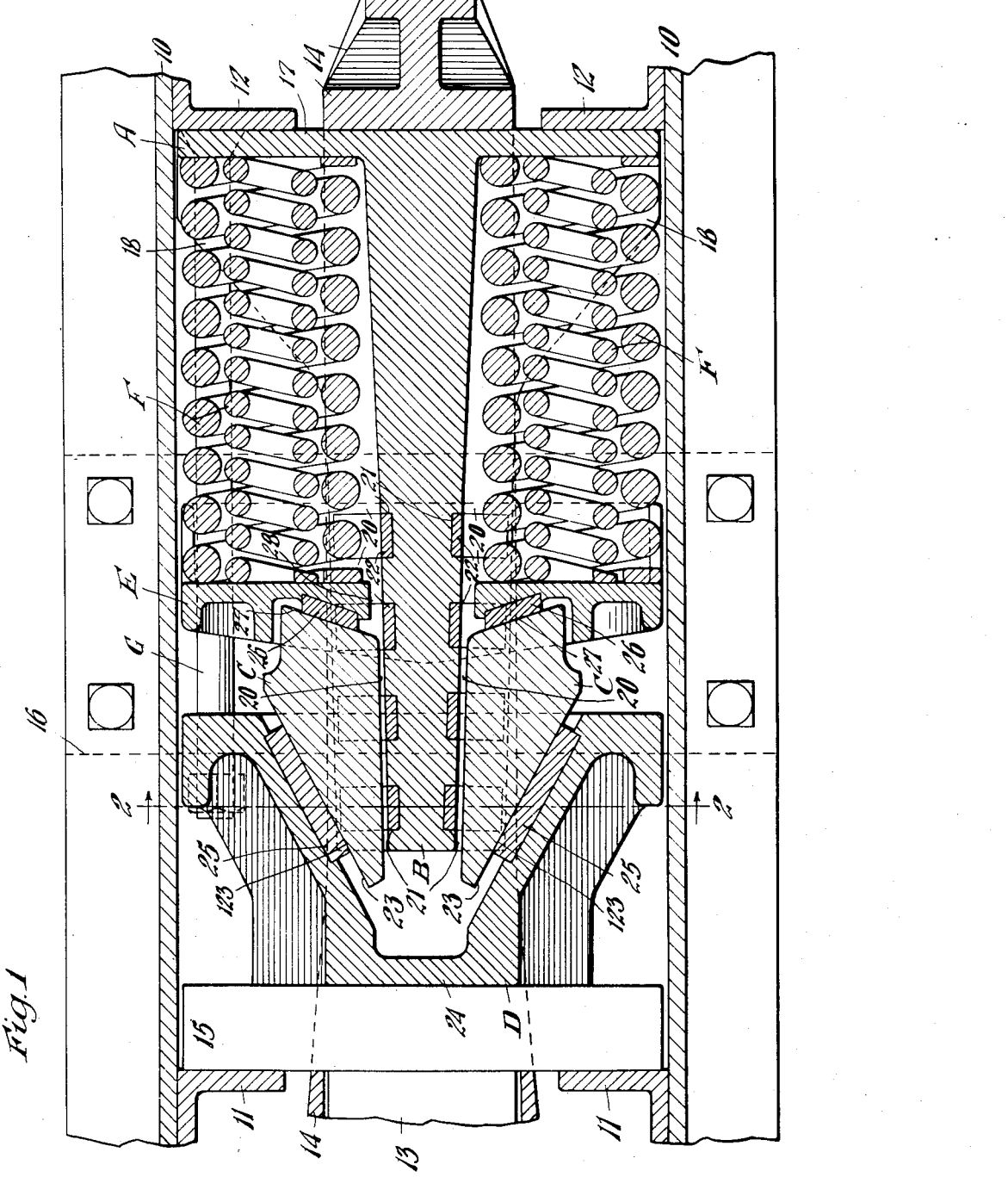

Jan. 15, 1929.  1,698,727
W. H. MINER
FRICTION SHOCK ABSORBING MECHANISM
Filed April 7, 1926   2 Sheets-Sheet 1

Witness
Wm. Geiger

Inventor
William H. Miner
By George I Haight
His Atty.

Jan. 15, 1929.  W. H. MINER  1,698,727
FRICTION SHOCK ABSORBING MECHANISM
Filed April 7, 1926   2 Sheets-Sheet 2
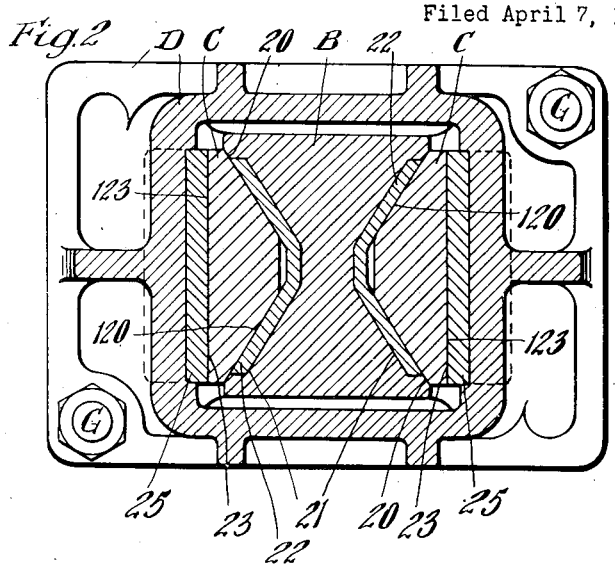
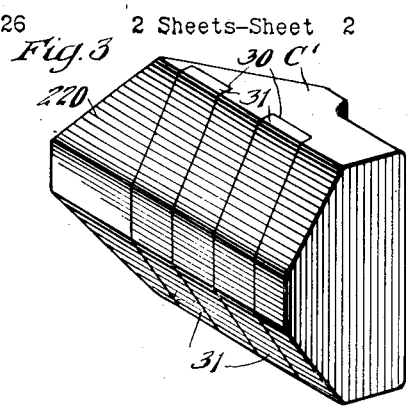
Witness
Wm. Geiger
Inventor
William H. Miner
By George I. Haight
His Atty.

Patented Jan. 15, 1929.

1,698,727

UNITED STATES PATENT OFFICE.

WILLIAM H. MINER, OF CHAZY, NEW YORK, ASSIGNOR TO W. H. MINER, INC., OF CHICAGO, ILLINOIS, A CORPORATION OF DELAWARE.

FRICTION SHOCK-ABSORBING MECHANISM.

Application filed April 7, 1926. Serial No. 100,253.

This invention relates to improvements in friction shock absorbing mechanisms.

One object of the invention is to provide a high capacity friction shock absorbing mechanism, including cooperating relatively movable friction members having high capacity during compression of the mechanism and assured release.

A more specific object of the invention is to provide a mechanism of the character indicated, especially adapted for railway draft riggings, including a friction member having friction shoes cooperating therewith, wherein the friction member and shoes have cooperating friction surfaces so constructed as to prevent scoring thereof, and at the same time give high frictional capacity.

Another object of the invention is to provide a friction shock absorbing mechanism, including cooperating relatively movable friction elements having the inter-engaging friction surfaces thereof formed of metal having different characteristics to prevent scoring and yet give high frictional resistance, together with assured release.

A still further object of the invention is to provide a friction shock absorbing mechanism including relatively movable friction elements formed of hard metal such as steel, where one of the cooperating surfaces of the friction elements is provided with a section of metal softer than the surface of the cooperating element to prevent scoring and cutting of the inter-engaging surfaces under the high pressure to which they are subjected during compressive action of the mechanism and to act as a lubricant.

Other objects and advantages of the invention will more clearly appear from the description and claims hereinafter following.

In the drawings forming a part of this specification, Figure 1 is a longitudinal, horizontal, sectional view of a portion of a railway draft rigging showing my improvements in connection therewith. Figure 2 is a transverse, vertical, sectional view corresponding to the line 2—2 of Figure 1. And Figure 3 is a detailed perspective view of a friction shoe employed in connection with my invention showing a different embodiment of said invention.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13, to which is operatively connected the hooded yoke 14 of well known form. The shock absorbing mechanism proper, as well as a front main follower 15, are disposed within the hooded yoke and the parts are supported in operative position by a detachable saddle plate 16 fixed to the draft sills.

The improved shock absorbing mechanism proper, as shown in Figures 1 and 2 comprises broadly a rear follower A; a friction post B: a pair of friction shoes C—C; a front follower casing D; a spring follower E; twin spring resistance elements F—F; and a retainer bolt G.

The rear follower A is provided with a rear wall 17 adapted to cooperate with the rear stop lugs 12 in the manner of the usual rear follower. At the top and bottom of the end wall horizontally disposed, forwardly projecting flanges 18—18 are provided. The rear follower A has the central friction post B formed integral therewith.

The friction post B is in the form of a relatively heavy, longitudinally disposed column having a pair of rearwardly diverging friction surfaces 20—20 on the opposite sides thereof. As most clearly shown in Figure 2, each of the friction surfaces 20 is of V-shape. The friction post B is preferably formed of relatively hard metal such as steel and presents relatively dense friction surfaces 20—20. As most clearly shown in Figure 1, each of the friction surfaces 20 of the post is recessed at intervals as indicated at 21—21, four such recesses or openings being illustrated in the present instance. An insert 22 of material softer than the cooperating shoes C is disposed in each of the openings 21, each insert being of V-shape and having the outer surface thereof flush with the corresponding friction surface 20 of the post. The inserts 22 are formed of metal, preferably of malleable iron, but may also be formed of bronze or other similar metals.

The friction shoes C—C are two in number and disposed at opposite sides of the mechanism. Each of the shoes is preferably in the form of a steel casting and is adapted to cooperate with the corresponding side of the friction post B, each shoe being provided with a V-shaped friction surface 120 adapted to slide on the corresponding friction surface 20 of the post. As most clearly shown in Figure 1, each shoe is provided with a wedge face 23 at the outer side thereof.

The front follower D is preferably in the form of a hollow casting having a transverse vertical wall 24 adapted to bear on the front follower 15. The side walls of the follower casing D diverge rearwardly of the mechanism and are provided with a pair of releasing pads 25—25 on the inner surfaces thereof, the pads being seated in pockets formed in the side walls and presenting flat wedge faces 123 adapted to cooperate with the wedge faces 23 of the friction shoes C.

The spring follower E is in the form of a relatively heavy plate provided with a pair of seats at the forward side thereof in which releasing pads 26—26 of bronze or the like are seated. As most clearly shown in Figure 1, the pads 26 are angularly disposed so as to present laterally inclined front surfaces adapted to cooperate with similarly inclined surfaces 27—27 at the inner ends of the friction shoes C as most clearly shown in Figure 1. The spring follower is reinforced by horizontally and vertically disposed ribs. The spring follower E is provided with a central opening 28 adapted to loosely accommodate the friction post B, the opening 28 being of such a size that it will clear the post when the follower is in its innermost position upon full compression of the mechanism.

The main spring resistance elements F—F comprise two twin arranged sets of spring coils, each set comprising a relatively heavy outer coil and a lighter inner coil. The opposite ends of each set of coils bear respectively on the inner surface of the rear main follower and the spring follower E.

The retainer bolts G are two in number and are arranged at diagonally opposite corners of the mechanism, each bolt having its opposite ends anchored respectively to the rear main follower and the front follower casing. The retainer bolts serve to maintain the mechanism of uniform overall length and hold the spring resistance elements under initial compression. Inasmuch as the main springs are held under initial compression the expansive action of the same will compensate for wear of the various friction and wedge face of the mechanism.

The operation of my improved mechanism is as follows, assuming a compression stroke. The front follower casing D will be moved inwardly toward the post B, thereby setting up a wedging action between the follower casing D and the friction shoes C, forcing the shoes into tight frictional contact with the friction surfaces of the post B and also carrying the shoes inwardly of the mechanism. This action will continue either until the actuating force is reduced or the front end of the friction post is engaged by the transverse front end wall of the casing B, whereupon the pressure will be transmitted directly through the post and casing D to the draft sills. Upon reduction of the actuating force the expansive action of the main spring resistance elements F will return all of the parts to normal position, forcing the shoes outwardly along the friction surfaces of the post. By providing the inserts of malleable iron or other metal having similar characteristics on the friction post, scoring or cutting of the co-operating friction surfaces is prevented and the release of the mechanism is also assured, the inserts 22 preventing sticking of the parts. As the inserts are provided at spaced intervals along the main relatively hard steel friction surfaces of the post, it will be evident that the anti-scoring function is had without reducing the frictional capacity of the gear, high frictional resistance being obtained between the friction surfaces of the shoes and the relatively dense friction surfaces of the post in addition to the frictional resistance obtained between the shoes and the inserts. It will be evident that in case the inserts are formed of relatively soft metal such as bronze, an anti-friction lubricating action will be had between the faces of the shoes and inserts throughout the life of the mechanism.

Referring next to the embodiment of the invention as illustrated in Figure 3, C' indicates a friction wedge shoe in all respects similar to the friction wedge shoes hereinbefore described differing therefrom only in that the friction surface 220 thereof is provided with a pair of openings or sockets 30—30 having malleable iron or equivalent metal inserts 31—31 seated therein, the inserts 31 being V-shaped to correspond to the shape of the friction surface 220. As shown, the outer surfaces of the inserts 31 are flush with the friction surface 220 of the shoe. The friction shoes C' co-operate wth a friction post of substantially the same design as the post B hereinbefore described. As will be evident the friction shoes C' being provided with the inserts of softer metal will still further decrease the danger of scoring or cutting of the friction surfaces. It is further pointed out that the friction shoes C' may be employed in connection with a friction post having continuous relatively hard friction surfaces, that is, wherein the friction post is not provided with inserts.

It will be noted that the inserts 22 and 31 hereinbefore referred to, have their outer surfaces flush with the remainder of the friction surface of the member in which inserted and also that each insert is relatively narrow and extended transverse to the line of relative movement between the two cooperating friction members. In this way, not only is scoring of the surfaces prevented or minimized but, by using inserts of proper material, such as malleable iron, said inserts act as a lubricant for the sliding friction surfaces, thus increasing the life of the parts and smoothing the friction action.

While I have herein shown and described what I now consider the preferred manner of carrying out the invention, the same is merely illustrative, and I contemplate all changes and modifications that come within the scope of the claims appended hereto.

I claim:

1. A friction shock absorbing mechanism including two cooperable metal elements having flat friction-generating surfaces arranged for relative longitudinal surface sliding engagement, one of said elements having an insert of different and relatively softer metal in the friction surface thereof, the exposed surface of said insert being flush with the friction surface of said element and said insert being relatively narrow and extended transversely of said line of relative movement between said elements.

2. A friction shock absorbing mechanism including a column acting element having a flat friction-generating surface and a co-operable friction element having a corresponding flat friction surface, one of said elements having an insert of relatively softer metal in the friction surface thereof, the exposed surface of the insert being flush with the remainder of the friction surface of said element, said insert being relatively narrow compared with the extent of the friction surface in which it is inserted and extended transversely thereof.

3. In a friction shock absorbing mechanism, the combination with a friction post element having friction surfaces extending lengthwise thereof; of a spring resistance; friction shoe elements cooperable with said post elements; and wedging means cooperable with the said shoe elements, some of the cooperating friction surfaces of said elements having flush, relatively narrow metal inserts extended transversely of the line of relative movement of said elements.

4. In a friction shock absorbing mechanism, two cooperable metal elements having friction-generating surfaces arranged for relatively extended longitudinal surface sliding engagement, one of said elements having a flush insert of different and relatively softer metal in the friction surface thereof, said insert being of comparatively short extent in the direction of line of relative movement between said two elements; a spring resistance; and wedge means co-acting with said elements to create pressure therebetween during a compression stroke.

5. A friction shock absorbing mechanism including two cooperable metal elements having friction-generating surfaces arranged for relatively extended longitudinally surface sliding engagement, one of said elements having a plurality of spaced flush inserts composed of different and relatively softer metal in the friction surface thereof, said inserts being of comparatively short extent in the direction of the line of relative movement between said two elements; a spring resistance; and wedge means co-acting with said elements to create pressure therebetween during a compression stroke.

6. In a friction shock absorbing mechanism, the combination with a column-acting element having a flat friction-generating surface; of a cooperable friction element also having a flat friction-generating surface, the friction-generating surface of one of said elements comprising an insert of metal softer than that of the surface with which it cooperates.

7. In a friction shock absorbing mechanism, the combination with a column-acting element provided with a friction surface; of a cooperating friction element having also a friction surface, one of said surfaces being provided with an insert of metal softer than that of the surface with which it cooperates.

In witness that I claim the foregoing I have hereunto subscribed my name this 2nd day of April, 1926.

WILLIAM H. MINER.